(No Model.)
A. PATTERSON.
THERMO CHEMICAL ELECTRIC BATTERY.
No. 262,110. Patented Aug. 1, 1882.
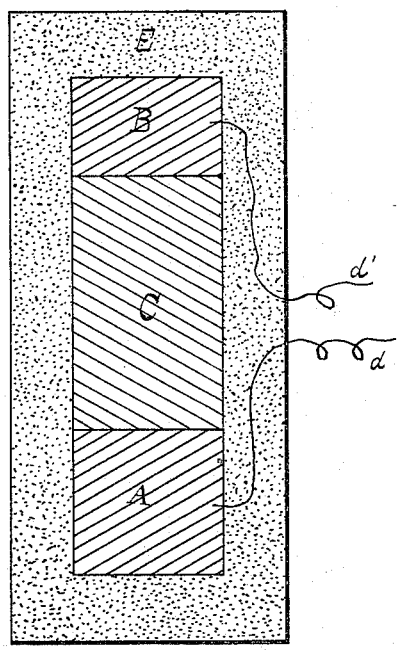
Witnesses
R. C. Trumbull
F. F. Davison.
Inventor
Andrew Patterson

UNITED STATES PATENT OFFICE.

ANDREW PATTERSON, OF IDLEWOOD, PENNSYLVANIA.

THERMO-CHEMICAL ELECTRIC BATTERY.

SPECIFICATION forming part of Letters Patent No. 262,110, dated August 1, 1882.

Application filed May 6, 1882. (No model.)

*To all whom it may concern:*

Be it known that I, ANDREW PATTERSON, a citizen of the United States, residing at Idlewood, in Allegheny county, State of Pennsylvania, have invented or discovered a certain new and useful improvement in developing electric force by the joint action of heat and chemical affinity, which I term a "Thermo-Chemical Electric Battery;" and I hereby declare that the following is such a full, clear, and exact description of my invention or discovery as will enable others skilled in the art to which it appertains to make and use the same.

The nature of my invention consists in developing an electric current by the joint action of heat and chemical affinity on a mass of metal in the relation of the positive element in an electric cell and another mass of the same metal in the relation of the negative element with a mass of the same metal in chemical combination with an electro-negative interposed between said positive and negative elements of the cell.

The following description and illustration of my invention will sufficiently explain the mode of making and using it, not only with the materials described, but with other materials having similar chemical and electrical relations to each other.

The accompanying drawing represents a vertical section of a single cell of my improved battery.

A and B are compact masses (not necessarily solid, and preferably comminuted, so as to afford large surface with interspaces within small compass) of metallic copper.

C is a mass of sulphuret of copper.

E is an envelope of clay or other refractory insulating material, inclosing the active parts and keeping them in place.

$d$ and $d'$ are conducting-wires, which may be joined at their ends to complete the circuit of the single cell, or they may be alternately joined with other elements, A and B, in other cells, as is the case with the usual construction of chemical or thermo batteries.

Thus constructed, my improved cell or battery is set in action by exposing either end of it to a temperature sufficient to excite in the cell a thermo-electric current. The copper in the heated end is then, as I understand the relations, electrically positive as to the copper in the cooler end, and also as to the interposed mass of sulphuret, and the copper in the cooler end is electrically negative to the sulphuret of copper and to the heated copper. If, now, the heat be continued at a sufficient degree until the temperature at the junction between the cooler copper and the sulphuret is sufficient to permit molecular action in the sulphuret, chemical action and electrolysis result. The heated or positive copper unites with sulphur of the interposed compound, and the liberated copper of the compound is deposited against the cooler copper in a manner analogous to that in which the deposition takes place in an ordinary decomposition-cell, or in a zinc-and-copper cell excited by a salt of copper in solution.

The chemical action between the heated copper and the sulphur of the sulphuret gives rise to an electric current supplemental to the thermo-electric current, and the cell or battery may be thus continued in action until a considerable quantity of copper has been in effect transferred from one plate to the other. If, then, the heat be withdrawn from the already-heated end and applied to the opposite end of the cell, the copper in that end becomes positive, and the same thermo and chemically-excited currents are set in action, but in a reverse direction, and the transfer of copper is also reversed. This alternation of the application of heat and the direction of the electric current may be continued indefinitely, the current being available for any purpose to which its quantity or tension makes it applicable.

It is proper to say that I do not confine myself to the precise form of cell or other parts shown; but my invention inheres in the functional relations of the parts, and, preserving these relations, the parts may be given any convenient form or construction. Nor do I confine myself to the use of copper and copper sulphuret for the active materials of my improved cell; but I propose to use other substances having similar chemical and electrical relations.

Any metal a combination of which with any negative electric can be decomposed and recomposed in the manner described can be substituted for copper, and its negative electric combination for the sulphuret of copper.

Having thus fully described my invention, what I claim, and desire to secure by Letters Patent, is—

In a thermo-chemical electric cell such as I have described, the combination, in the relation of positive and negative elements, of substances capable of having their electrical relations reversed by the reversal of their relative temperatures, with an interposed mass of a compound substance capable of decomposition and recomposition by the joint action of heat and an electric current, as and for the purpose specified.

ANDREW PATTERSON.

Witnesses:
GEO. N. MONRO,
EDWARD JAY ALLEN.